United States Patent [19]

Takeuchi et al.

[11] Patent Number: 4,463,133
[45] Date of Patent: Jul. 31, 1984

[54] RUBBER COMPOSITIONS SUITABLE FOR USE IN TIRE TREAD

[75] Inventors: Yasumasa Takeuchi; Mitsuhiko Sakakibara; Fumio Tsutsumi; Akio Takashima, all of Yokkaichi; Tatsuo Fujimaki, Kodaira; Shinsuke Yamaguchi, Tokyo; Seisuke Tomita, Higashimurayama, all of Japan

[73] Assignees: Bridgestone Tire Company Limited; Japan Synthetic Rubber Co., Ltd., both of Tokyo, Japan

[21] Appl. No.: 384,371

[22] Filed: Jun. 2, 1982

[30] Foreign Application Priority Data

Jun. 3, 1981 [JP] Japan .................................. 56-85480

[51] Int. Cl.³ .......................... C08L 7/00; C08L 9/00; C08L 9/06; C08L 53/02
[52] U.S. Cl. ....................................... 525/99; 525/97; 525/914
[58] Field of Search ............................ 525/99, 914, 97

[56] References Cited

U.S. PATENT DOCUMENTS

| | | | |
|---|---|---|---|
| 3,265,765 | 8/1966 | Holden et al. | 525/99 |
| 3,526,606 | 9/1970 | Minekawa et al. | 525/99 |
| 4,294,937 | 10/1981 | Whitehead | 525/99 |
| 4,383,085 | 5/1983 | Fujimaki et al. | 525/196 |

FOREIGN PATENT DOCUMENTS

| | | | |
|---|---|---|---|
| 888624 | 1/1962 | United Kingdom | 525/99 |
| 1423437 | 2/1976 | United Kingdom | 525/99 |

*Primary Examiner*—Allan Lieberman
*Attorney, Agent, or Firm*—Sughrue, Mion, Zinn, Macpeak, and Seas

[57] ABSTRACT

A rubber composition suitable for use in tire tread is disclosed, which contains at least 20 parts by weight of a block copolymer per 100 parts by weight of total rubber content. This block copolymer comprises (A) a polymer segment obtained by starting from conjugated diolefin and monovinyl aromatic hydrocarbon and having a content of monovinyl aromatic hydrocarbon bond of not more than 10% by weight and (B) a copolymer segment obtained by copolymerization of conjugated diolefin and monovinyl aromatic hydrocarbon and having a content of monovinyl aromatic hydrocarbon bond of 15-50% by weight. Further, the block copolymer satisfies the following conditions:

(i) the block copolymer contains at least 10% by weight of each of the segments (A) and (B);
(ii) a total content of monovinyl aromatic hydrocarbon bond in the block copolymer is 10-40% by weight;
(iii) an average content of vinyl bond in conjugated diolefin portion of the block copolymer is 20-70% by weight; and
(iv) the block copolymer includes at least 20% by weight of a polymer having a metal-carbon bond in its molecular chain.

5 Claims, No Drawings

RUBBER COMPOSITIONS SUITABLE FOR USE IN TIRE TREAD

This invention relates to rubber compositions suitable for use in tire tread, which contain a block copolymer containing two polymer segments with different contents of monovinyl aromatic hydrocarbon bond, obtained by starting from a conjugated diolefin and monovinyl aromatic hydrocarbon, wherein the block copolymer has a metal-carbon bond in its molecular chain.

Recently, rubber materials having a low rolling resistance and a high wet skid resistance have been strongly demanded as a tire tread rubber for automobiles from viewpoints of low fuel consumption and running safety in automobiles. Since these two properties are contrary to each other, however, the use of single rubber is impossible to simultaneously satisfy the contrary properties together with the wear resistance. Now, rubber blends composed of various different rubbers have been used for well matching the contrary properties. As a tire tread rubber for automobiles, for instance, there has been used a rubber blend consisting of styrene-butadiene copolymer rubber having a relatively high wet skid resistance and including 10–30% by weight of bound styrene and not more than 20% by weight of vinyl bond, and polybutadiene rubber having a low rolling resistance and a good wear resistance and including not more than 20% by weight of vinyl bond. However, the latter rubber blend is still insufficient in the wet skid resistance.

Lately, there have been attempts to modify styrene-butadiene rubber (SBR) or butadiene rubber (BR) by mainly using an organo lithium initiator in order to improve the wet skid resistance and the rolling resistance. Particularly, rubber compositions inclusive of BR having a higher content of vinyl bond have been proposed for fitting to the above object (British Pat. No. 1,166,832). The BR having a higher content of vinyl bond is excellent for taking a balance between the wet skid resistance and the rolling resistance, but is considerably poor in the fracture properties and wear resistance, so that it is very difficult to use such a BR alone. For this reason, rubber blends of BR with diene rubber such as natural rubber (NR), high cis-BR, emulsion polymerized SBR or the like have been proposed in order to improve the fracture properties and wear resistance. However, the rubber blend of BR with NR or high cis-BR is poor in the balance between the wet skid resistance and the fracture properties or wear resistance, while the rubber blend of BR with SBR is poor in the rolling resistance.

In Japanese Patent laid open No. 62,248/79, an attempt has been made to improve the wet skid resistance and rolling resistance by using a random SBR wherein the content of bound styrene is 20–40% by weight and the content of vinyl bond in butadiene portion is relatively high. In this case, the balance among the wet skid resistance, rolling resistance, wear resistance and the like is certainly improved as compared with the case of using the conventional emulsion polymerized SBR or SBR obtained by using the organo lithium initiator, but the use of random SBR is not yet satisfactory in practice, so that it must be used by blending with the other diene rubber. Even in the latter case, the balance among the wet skid resistance, rolling resistance, fracture properties and wear resistance is still unsatisfactory likewise the case of using BR having a higher content of vinyl bond.

The inventors have made various studies with respect to the provision of rubber materials having a good balance among the wet skid resistance, rolling resistance, wear resistance and the like and found out that the balance among the aforementioned properties is improved by selecting the contents of bound styrene and vinyl bond in each segment of styrene-butadiene block copolymer, which consists of random copolymer segments having different contents of bound styrene and vinyl bond, within particular ranges as proposed in Japanese Patent Application Nos. 178,226/80, 186,194/80 and 186,195/80. However, tires obtained by using such a block copolymer alone or in a blend with a different rubber yet leave room for improvement in the wear resistance and fracture properties because the safety and low fuel consumption for tires have been increasingly demanded in industry.

The inventors have made further studies with respect to such styrene-butadiene block copolymers. As a result, it has been found that a rubber composition inclusive of a block copolymer having a Moony viscosity $(ML_{1+4}^{100° C.})$ of 20–150 and consisting of two particular random copolymer segments having different contents of monovinyl aromatic hydrocarbon bond, coupled by means of a metal-carbon bond in its molecular chain, achieves the object of the invention.

According to the invention, there is the provision of a rubber composition suitable for use in tire tread containing at least 20 parts by weight of a block copolymer per 100 parts by weight of total rubber content, said block copolymer comprising (A) a polymer segment obtained by starting from a conjugated diolefin and a monovinyl aromatic hydrocarbon and having a content of monovinyl aromatic hydrocarbon bond of not more than 10% by weight and (B) a copolymer segment obtained by copolymerization of a conjugated diolefin and a monovinyl aromatic hydrocarbon and having a content of monovinyl aromatic hydrocarbon bond of 15–50% by weight, and satisfying the following conditions:

(i) said block copolymer contains at least 10% by weight of each of said segments (A) and (B);

(ii) a total content of monovinyl aromatic hydrocarbon bond in said block copolymer is 10–40% by weight;

(iii) an average content of vinyl bond in a conjugated diolefin portion of said block copolymer is 20–70% by weight; and (iv) said block copolymer includes at least 20% by weight of a metal-carbon bond in its molecular chain.

According to the invention, the excellent properties of the rubber composition are first obtained by using a block copolymer produced by block copolymerization of two random copolymer segments (A) and (B) having different monomer compositions and glass transition temperatures, a part of which further having metal-carbon bond in its molecular chain.

On the other hand, the excellent balance between the wet skid resistance and the rolling resistance aimed at the invention can not be obtained when the random copolymer (A) and the random copolymer (B) are merely blended with the other rubber. Moreover, the rubber composition containing the block copolymer according to the invention is superior in the fracture properties and wear resistance to rubber compositions inclusive of a block copolymer having no metal-carbon bond.

According to the invention, the block copolymer is blended with at least one rubber selected from natural rubber, cis-polyisoprene rubber, polybutadiene rubber, styrene-butadiene copolymer rubber, ethylene-propylene-diene terpolymer rubber and butyl rubber.

In the rubber composition according to the invention, the block copolymer is used in an amount of at least 20 parts by weight, preferably not less than 30 parts by weight per 100 parts by weight of total rubber content. When the amount of the block copolymer used is less than 20 parts by weight, the excellent properties, particularly wet skid resistance aimed at the invention can not be obtained.

In the block copolymer according to the invention, styrene, α-methyl styrene, para-methyl styrene and the like are usually used as a monovinyl aromatic hydrocarbon, and among them the use of styrene is preferable. The content of monovinyl aromatic hydrocarbon bond is not more than 10% by weight in the polymer segment (A), and 15-50% by weight, preferably 20-45% by weight in the copolymer segment (B), respectively. Furthermore, the total content of monovinyl aromatic hydrocarbon bond in the block copolymer is 10-40% by weight, preferably 15-35% by weight. When the content of monovinyl aromatic hydrocarbon bond in the polymer segment (A) exceeds 10% by weight, the rolling resistance is poor. When the content of monovinyl aromatic hydrocarbon bond in the copolymer segment (B) is less than 15% by weight, the wet skid resistance and fracture properties are poor, while when the content exceeds 50% by weight, the rolling resistance is poor.

As the conjugated diene to be used in the production of block copolymer, there are mentioned butadiene, isoprene and the like.

The bonding state of the conjugated diene in each segment of the block copolymer is not particularly critical, but it is necessary that the average content of vinyl bond in the block copolymer is within a range of 20-70% by weight in view of the balance between the wet skid resistance and the rolling resistance.

According to the invention, the block copolymer must contain at least 10% by weight, preferably not less than 20% by weight of each of the polymer segments (A) and (B). When the ratio of the polymer segment (A) is less than 10% by weight, the rolling resistance of the resulting rubber composition is poor, while when the ratio of the copolymer segment (B) is less than 10% by weight, the fracture properties and wear resistance are poor.

As the bonding type of the block polymer, there are mentioned block of segment (A)—segment (B), multiblock of [segment (A)—segment (B)]n, block of segment (A)—segment (B)—segment (A), block of segment (B)—segment (A)—segment (B) and the like.

A great feature of the rubber composition according to the invention lies in that the block copolymer includes a metal-carbon bond in its molecular chain. The metal-carbon bond is included in the block copolymer in an amount of not less than 20% by weight. When the content of such a bond is less than 20% by weight, the fracture properties of the resulting rubber composition become poor. As the metal to be bonded with carbon, mention may be made of silicon, germanium, tin, lead and the like, and among them the use of tin is preferable. Particularly, butadiene-tin bond is most preferable as metal-carbon bond.

In the block copolymer according to the invention, the rolling resistance is especially improved when the terminal portion of the molecule of the polymer having the metal-carbon bond in its molecular chain is the segment (A). Particularly, the rolling resistance is excellent when the ratio of the segment (A) is not less than 20% by weight.

According to the invention, the block copolymer has a Mooney viscosity ($ML_{1+4}{}^{100°\ C.}$) of 20-150. When the Mooney viscosity is lower than 20, the fracture properties and rolling resistance are unfavorable, while when the Mooney viscosity is higher than 150, the workability is poor.

The block copolymers inclusive of the polymer having the metal-carbon bond in its molecular chain according to the invention are obtained by copolymerizing monovinyl aromatic hydrocarbon with conjugated diene at a monomer composition ratio of the desired segment (A) or (B) in the presence of ether or tertiary amine in a hydrocarbon solvent using an organo lithium compound, further adding monomers at a monomer composition ratio of the remaining segment thereto, and then adding a halide of a metal selected from silicon, germanium, tin, lead and the like to conduct coupling reaction.

The rubber compositions containing the block copolymer according to the invention not only are excellent in the wet skid resistance and rolling resistance but also improve the fracture properties and wear resistance, so that they are suitable as a rubber material for use in tire tread. In this case, the usually used compounding ingredients such as carbon black, process oil, filler, vulcanization accelerator, vulcanizing agent and the like may be added to the rubber composition.

The following examples are given in illustration of the invention and are not intended as limitations thereof.

EXAMPLES 1-9, COMPARATIVE EXAMPLES 1-9

Polymer samples shown in the following Table 1 (Run Nos. 1-15) were obtained by polymerization recipes shown in the following Table 2, respectively. In this case, cyclohexane and n-butyl lithium were used as a solvent and a polymerization initiator, respectively. At first, polymerization was performed under polymerization conditions of the segment (A). After the conversion of polymerization reached to 95-100%, predetermined amounts of monomer and ether were further charged and polymerized under polymerization conditions of the segment (B). After the completion of the polymerization, a predetermined amount of a coupling agent was added to perform coupling reaction.

The contents of bound styrene and vinyl bond in the resulting polymer were measured by means of an infrared spectrophotometer. Particularly, the microstructure of the butadiene portion in the polymer was determined according to D. Morero's method, and the bound styrene in the polymer was determined from the calibration curve using the absorbance at 699 $cm^{-1}$. The content of metal-carbon bond was determined from the ratio of high molecular weight components measured by a gel permeation chromatography.

Rubber compositions were prepared by using polymer samples of Run Nos. 1-15 in accordance with a compounding recipe as shown in the following Table 3. Each of these rubber compositions was vulcanized at 145° C. for 30 minutes. The resulting vulcanizate had properties as shown in the following Table 4.

Moreover, wet skid resistance measured by a skid tester was used as an index for wet skid resistance, Dunlop rebound resilience at 70° C. was used as an index for rolling resistance, and tensile strength was used as an index for fracture properties.

TABLE 1

| Run No. | Segment (A) Vinyl content of butadiene (%) | Segment (A) Bound styrene (%) | Segment (B) Vinyl content of butadiene (%) | Segment (B) Bound styrene (%) | Polymer as a whole Vinyl content of butadiene (%) | Polymer as a whole Bound styrene (%) | Ratio of metal-carbon bond (%) | Moony viscosity (ML$_{1+4}^{100°C.}$) | (A)/(B) weight ratio | Coupling agent |
|---|---|---|---|---|---|---|---|---|---|---|
| 1 | 12 | 5 | 62 | 35 | 40 | 25 | 49 | 60 | ½ | SNCl$_4$ |
| 2 | 30 | 0 | 51 | 35 | 42 | 23 | 52 | 61 | " | " |
| 3 | 51 | 0 | 29 | 35 | 39 | 23 | 50 | 55 | " | " |
| 4 | 50 | 0 | 42 | 35 | 45 | 23 | 54 | 62 | " | " |
| 5 | isoprene 25 | 0 | 53 | 35 | — | 23 | 50 | 55 | " | " |
| 6 | 31 | 0 | 49 | 35 | 41 | 23 | 55 | 60 | " | SiCl$_4$ |
| 7 | 30 | 0 | 50 | 35 | 41 | 23 | 48 | 63 | " | GeCl$_4$ |
| 8 | 50 | 5 | 50 | 60 | 50 | 42 | 50 | 55 | " | SnCl$_4$ |
| 9 | 31 | 20 | 51 | 20 | 41 | 20 | 53 | 61 | " | " |
| 10 | 45 | 25 | — | — | 45 | 25 | 48 | 58 | — | " |
| 11 | 45 | 25 | — | — | 45 | 25 | — | 57 | — | — |
| 12 | 30 | 0 | 50 | 35 | 41 | 23 | — | 60 | ½ | — |
| 13 | 75 | 0 | 70 | 20 | 72 | 13 | 50 | 54 | " | SnCl$_4$ |
| 14 | 12 | 0 | 27 | 30 | 18 | 15 | 52 | 59 | 1/1 | " |
| 15 | 30 | 0 | — | — | 30 | 0 | — | 55 | — | — |

TABLE 2

| Run No. | Polymerization condition of segment (A) n-butyl lithium (g) | butadiene/ styrene (g) | tetra-hydrofuran (g) | Polymerization temperature (°C.) | Polymerization condition of segment (B) butadiene/ styrene (g) | tetra-hydrofuran (g) | Polymerization temperature (°C.) | Coupling agent and its addition amount (g) | (A)/(B) weight ratio |
|---|---|---|---|---|---|---|---|---|---|
| 1 | 0.36 | 159/8 | — | 50 | 216/117 | 17.5 | 40 | SnCl$_4$ 0.22 | ½ |
| 2 | 0.35 | 167/0 | 1.0 | 40 | " | " | 40-82 | " 0.21 | " |
| 3 | 0.33 | 167/0 | 4.5 | " | " | 4.5 | 50-93 | " 0.20 | " |
| 4 | 0.37 | 167/0 | " | " | " | " | 50 | " 0.23 | " |
| 5 | isoprene 0.33 | 167/0 | 1.5 | " | " | 17.5 | 40-80 | " 0.20 | " |
| 6 | 0.35 | 167/0 | 1.0 | " | " | " | 40-83 | SiCl$_4$ 0.14 | " |
| 7 | 0.37 | 167/0 | " | " | " | " | 40-82 | GeCl$_4$ 0.19 | " |
| 8 | 0.41 | 159/8 | 4.5 | 40 | 133/200 | 18.0 | 50 | SnCl$_4$ 0.25 | " |
| 9 | 0.36 | 134/33 | 1.5 | " | 266/67 | 16.0 | 40-80 | " 0.22 | " |
| 10 | 0.31 | 375/125 | 5.0 | 50 | — | — | — | " 0.19 | — |
| 11 | 0.24 | " | " | " | — | — | — | — | — |
| 12 | 0.27 | 167/0 | 1.0 | 40 | 216/117 | 17.5 | 40-79 | — | ½ |
| 13 | 0.33 | 167/0 | 16.0 | 30 | 266/67 | 17.5 | 30 | SnCl$_4$ 0.20 | " |
| 14 | 0.36 | 250/0 | — | 50 | 175/75 | 4.0 | 50-95 | " 0.22 | 1/1 |
| 15 | 0.32 | 500/0 | 1.0 | 40 | — | — | — | — | — |

Solvent:cyclohexane 2,000 g

TABLE 3

| Compounding recipe | parts by weight |
|---|---|
| Polymer | 100 |
| Carbon black HAF | 50 |
| Stearic acid | 2 |
| Zinc white | 3 |
| Antioxidant 810 NA[1] | 1 |
| Vulcanization accelerator CZ[2] | 0.6 |
| Vulcanization accelerator M[3] | 0.6 |
| Vulcanization accelerator D[4] | 0.4 |
| Sulfur | 1.5 |

Note:
[1]N—phenyl-N'—isopropyl-p-phenylenediamine
[2]N—cyclohexyl-2-benzothiazolyl sulfeneamide
[3]2-mercaptobenzothiazole
[4]1, 3-diphenylguanidine

TABLE 4

| | Polymer Run No. | Polymer (parts) | NR (parts) | cis-BR*[1] (parts) | Emulsion*[2] polymer-ized SBR (parts) | Hardness*[3] (JIS-A) | 300%*[3] modulus (kgf/cm²) | Tensile*[3] strength (kgf/cm²) | Elonga-tion*[3] (%) | Dunlop rebound resilience at 70° C. (%) | Wet skid*[4] resis-tance (index) | Lam-bourn*[5] wear (index) |
|---|---|---|---|---|---|---|---|---|---|---|---|---|
| | | | | | (a) | | | | | | | |
| Example | | | | | | | | | | | | |
| | 1 | 1 | 50 | 50 | — | — | 69 | 170 | 290 | 480 | 72 | 110 | 115 |
| | 2 | 2 | " | " | — | — | 68 | 165 | 293 | 490 | 71 | 120 | 120 |
| | 3 | 3 | " | " | — | — | 67 | 160 | 295 | 500 | 72 | 110 | 125 |
| | 4 | 4 | " | " | — | — | 68 | 163 | 289 | 480 | 71 | 120 | 115 |
| | 5 | 5 | " | " | — | — | 67 | 161 | 295 | 490 | 72 | 125 | 110 |

TABLE 4-continued

| | Polymer | | | Emulsion*2 | | 300%*3 | Tensile*3 | Elon- | Dunlop rebound | Wet skid*4 | Lam- |
| | Run No. | NR (parts) | cis-BR*1 (parts) | polymer-ized SBR (parts) | Hardness*3 (JIS-A) | modulus (kgf/cm²) | strength (kgf/cm²) | ga-tion*3 (%) | resilience at 70° C. (%) | resis-tance (index) | bourn*5 wear (index) |
| --- | --- | --- | --- | --- | --- | --- | --- | --- | --- | --- | --- |
| | (parts) | | | | | | | | | | |
| 6 | 6 | " | " | — | — | 70 | 172 | 285 | 470 | 71 | 120 | 120 |
| 7 | 7 | " | " | — | — | 71 | 167 | 290 | 480 | 71 | 120 | 120 |
| 8 | 2 | " | 30 | 20 | — | 69 | 159 | 270 | 450 | 73 | 120 | 125 |
| 9 | " | " | 20 | 30 | 69 | 163 | 265 | 410 | 71 | 125 | 110 | |
| | | | | | (b) | | | | | | | |
| Comparative example | | | | | | | | | | | | |
| 1 | 1 | 15 | 85 | — | — | 67 | 150 | 320 | 510 | 73 | 70 | 130 |
| 2 | 8 | 50 | 50 | — | — | 70 | 173 | 265 | 430 | 64 | 140 | 85 |
| 3 | 9 | " | " | — | — | 69 | 165 | 288 | 500 | 70 | 90 | 110 |
| 4 | 10 | " | " | — | — | 69 | 165 | 285 | 490 | 71 | 100 | 100 |
| 5 | 12 | " | " | — | — | 71 | 170 | 265 | 470 | 69 | 15 | 95 |
| 6 | 13 | " | " | — | — | 72 | 168 | 240 | 420 | 67 | 135 | 80 |
| 7 | 14 | " | " | — | — | 70 | 155 | 290 | 490 | 73 | 80 | 110 |
| 8 | 11/15 | 25/25 | 50 | — | — | 70 | 163 | 250 | 430 | 70 | 110 | 90 |
| 9 | — | — | 50 | — | 50 | 68 | 150 | 295 | 510 | 71 | 80 | 120 |

*1 made by Japan Synthetic Rubber Co., Ltd. BR01 (cis-1, 4 95%)
*2 made by Japan Synthetic Rubber Co., Ltd. SBR-1500
*3 JIS K-6301
*4 measured on wet asphalt road using a skid tester made by Stanley, A.E. Mfg. Co., and expressed by an index on a basis that Comparative Example 4 is 100. The larger the value, the better the property.
*5 expressed by an index on a basis that Comparative Example 4 is 100. The larger the value, the better the property.

As apparent from Table 4, Examples 1–9 are excellent in the tensile strength, Dunlop rebound resistance, wet skid resistance and Lambourn wear and have a well balance among these properties.

On the other hand, in Comparative Examples 2, 3, 6 and 7, the content of bound styrene or vinyl bond is outside the range defined in the invention, so that any one of the wet skid resistance, Dunlop rebound resilience and wear resistance is poor. In Comparative Example 5 using the block copolymer having no metal-carbon bond, the tensile strength and wear resistance are inferior to those of Examples 1–9. In Comparative Example 4 using the polymer sample obtained by coupling random SBR with SnCl4, the wet skid resistance and the like are yet unsatisfactory. A simple blend of two random SBRs having structures of the segments (A) and (B) (Comparative Example 8) can not develop the properties of the block copolymer according to the invention. Furthermore, the wet skid resistance is poor in Comparative Example 1 wherein the content of block copolymer according to the invention is small and in Comparative Example 9 using a blend of emulsion polymerized SBR and NR, respectively.

Then, each of the rubber compositions as shown in Examples 1–9 and Comparative Examples 1–9 was used to produce a tread of tire having a size of 165 SR 13 and the wear resistance, rolling resistance, wet braking, wet slalom and durability on bad road were evaluated to obtain results as shown in the following Table 5.

Moreover, the above properties are evaluated as follows:

Wear Resistance

The test tire was run on public road over a distance of 10,000 km and then the depth of the remaining tread groove was measured, from which was determined a running distance required for wearing the tread by 1 mm. This property was defined by an index on the basis that Comparative Example 4 is 100, which corresponds to 8,000 km/mm. The larger the index value, the better the property.

Rolling Resistance

The test tire subjected to an internal pressure of 1.7 kg/cm² was run on a steel drum, which was rotated by the driving of a motor, at a speed of 100 km/hr under a JIS 100% load and then the driving of the motor was stopped to run the drum by inertia, during which the rolling resistance of the tire to the drum was measured. This property was defined by an index on the basis that Comparative Example 4 is 100. The smaller the index value, the better the property.

Wet Braking

A vehicle provided with the test tire was run on a wet concrete road having a water depth of 3 mm at a speed of 80 km/hr and then subjected to rapid braking at this speed, whereby a running distance required for completely stopping the vehicle was measured. This property was defined by an index on the basis that Comparative Example 4 is 100. The smaller the index value, the better the property.

Wet Slalom

A vehicle provided with the test tire was run on a wet concrete road having a water depth of 3 mm and including pylons set at an interval of 30 m with respect to the running direction and a zigzag pitch of 1 m with respect to a direction perpendicular to the running direction. Then, a time required for passing the vehicle through the outside of the pylon at a speed as fast as possible over a distance of 100 m was measured. This property was defined by an index on the basis that Comparative Example 4 is 100. The smaller the index value, the better the property.

Durability on Bad Road

The test tire was run on public road, 70% of which being a bad road containing pebbles scattered thereon, over a distance of 5,000 km. Thereafter, the presence of external injury on tread surface and cut failure was observed.

TABLE 5

(a) Example

| | 1 | 2 | 3 | 4 | 5 | 6 | 7 | 8 | 9 |
|---|---|---|---|---|---|---|---|---|---|
| Wear resistance | 100 | 118 | 122 | 115 | 108 | 120 | 115 | 122 | 110 |
| Rolling resistance | 97 | 100 | 98 | 99 | 97 | 100 | 98 | 95 | 100 |
| Wet braking | 90 | 83 | 91 | 82 | 81 | 82 | 84 | 83 | 80 |
| Wet slalom | 93 | 85 | 92 | 85 | 84 | 85 | 84 | 85 | 83 |
| Durability on bad road | not trouble | not trouble | not trouble | not trouble | not trouble | not trouble | not trouble | not trouble | not trouble |

(b) Comparative Example

| | 1 | 2 | 3 | 4 | 5 | 6 | 7 | 8 | 9 |
|---|---|---|---|---|---|---|---|---|---|
| Wear resistance | 125 | 85 | 105 | 100 | 98 | 85 | 110 | 95 | 123 |
| Rolling resistance | 96 | 118 | 104 | 100 | 105 | 110 | 95 | 103 | 101 |
| Wet braking | 140 | 70 | 110 | 100 | 89 | 77 | 128 | 90 | 120 |
| Wet slalom | 145 | 75 | 113 | 100 | 93 | 80 | 130 | 93 | 125 |
| Durability on bad road | not trouble | not trouble | not trouble | not trouble | trouble occured | trouble occured | not trouble | trouble occured | not trouble |

What is claimed is:

1. A rubber composition suitable for use in tire tread containing at least 20 parts by weight of a block copolymer per 100 parts by weight of the total rubber content, said block copolymer comprising (A) a polymer segment obtained by copolymerization of a conjugated diolefin and a monovinyl aromatic hydrocarbon and having a monovinyl aromatic hydrocarbon bond content of not more than 10% by weight and (B) a copolymer segment obtained by copolymerization of a conjugated diolefin and a monovinyl aromatic hydrocarbon and having a monovinyl aromatic hydrocarbon bond content of 15-50% by weight, and satisfying the following conditions:

(i) said block copolymer contains at least 10% by weight of each of said segments (A) and (B);

(ii) the total content of the monovinyl aromatic hydrocarbon bond in said copolymer is 10-40% by weight;

(iii) the average content of the vinyl bond in the conjugated diolefin portion of said block copolymer is 20-70% by weight;

(iv) at least 20% by weight of said block copolymer has a metal-carbon bond in its molecular chain;

(v) said block copolymer has a Moony viscosity ($ML_{1+4}^{100° C.}$) of 20-150, wherein said block copolymer is blended with at least one rubber selected from the group consisting of natural rubber, cis-polyisoprene rubber, polybutadiene rubber, styrene-butadiene copolymer rubber, ethylene-propylene-diene terpolymer rubber and butyl rubber.

2. A rubber composition according to claim 1, wherein said block copolymer is blended in an amount of not less than 30 parts by weight per 100 parts by weight of the total rubber content.

3. A rubber composition according to claim 1, wherein the metal of said metal-carbon bond is selected from the group consisting of silicon, germanium, tin and lead.

4. A rubber composition according to claim 1, wherein said metal-carbon bond is butadienyl-metal or isoprenyl-metal bond.

5. A rubber composition according to claim 1, wherein a terminal portion of said polymer having the metal-carbon bond is said polymer segment (A).

* * * * *